United States Patent [19]
Elg

[11] 3,846,891
[45] Nov. 12, 1974

[54] APPARATUS FOR REMOVING FLANGED CUP BEARINGS FROM HEAVY DUTY UNIVERSAL JOINTS

[76] Inventor: Carl L. Elg, 5224 38th Ave. S., Minneapolis, Minn. 55417

[22] Filed: Dec. 20, 1973

[21] Appl. No.: 426,970

[52] U.S. Cl. ............................. 29/201 R, 29/257
[51] Int. Cl. .......................................... B23p 19/04
[58] Field of Search ............... 29/201 R, 201 D, 257

[56] References Cited
UNITED STATES PATENTS

| | | | |
|---|---|---|---|
| 3,102,333 | 9/1963 | Thornton et al. | 29/257 |
| 3,237,291 | 3/1966 | Kelso | 29/201 |

Primary Examiner—Thomas H. Eager
Attorney, Agent, or Firm—Donald A. Jacobson

[57] ABSTRACT

An attachment for forcing a flanged cup bearing outward from its recess in the yoke of a heavy duty universal joint is described. The device comprises attachment means to both sides of a first yoke of a universal joint and pressure means to the remaining second yoke; said attachment means permitting the first yoke to be forced upward by a screw toward the bearing in the second yoke, thus forcing a flanged cup bearing in the second yoke out of its recess.

5 Claims, 3 Drawing Figures

APPARATUS FOR REMOVING FLANGED CUP BEARINGS FROM HEAVY DUTY UNIVERSAL JOINTS

BACKGROUND OF THE INVENTION

It has been the practice in the disassembly of truck universal joints and other heavy duty type universal joints, having flanges attached to the bearing cups, to affect the dissassembly by placing a steel bar across a yoke and striking the bar with a heavy maul. If done properly, the bearing cup to be removed will be forced outward from the yoke and exposed, whereupon the cup can then be struck directly with the maul and removed.

This dissassembly process is made difficult by the fact that the universal joint in a truck, and in many other types of heavy duty equipment using flanged bearing cups, are in an extemely awkward position to be worked upon. In addition, the universal joints are exposed to the elements in their operation and often the bearing cups become seized in place and are consequently extremely difficult to remove.

The present practice is not particularly efficient and the additional difficulties encountered, ennumerated above, results in a considerable amount of time being required to remove the bearings. The usual dissassembly process also often results in a yoke being knocked out of alignment, which in turn necessitates the removal and replacement of an entire universal joint. Since the removal of an entire universal joint is more time consuming than the removal and replacement of the bearings only, and since an entire universal joint is several times more expensive than the bearings alone; care must be exercised to prevent damage to avoid the cost of damaging the universal joint yoke. In some instances, the universal joints are so positioned that the bearings and cross must be removed to detach the said universal joint from the shafts. In this case the bearings must be removed in place no matter how difficult or time consuming the process may be.

There have been some tools developed to remove automotive type, light duty universal joint bearing cups, which do not have a bearing flange attachment. As an example, reference is made to Thornton U.S. Pat. No. 3,102,333. In this patent the yoke is restrained by the tool and the bearing cup pressed out by an inward force on the bearing cup which forces the bearing cup into and through the mating recess on the yoke. Truck universal joint bearings and other heavy duty universal joint bearings, however, cannot be removed in this manner, because of the flange which is permanently attached, usually by welding, to the exposed surface of the bearing cup. This flange normally has two holes in it through which bolts are inserted to secure the bearing cup within the yoke. This type of bearing cup must be withdrawn from the yoke and cannot be forced through the yoke, as can automobile type bearings, because of these permanently affixed flanges. In addition, many of the present tools require that the universal joint be removed from the vehicle or other device before the tool can be attached.

SUMMARY OF THE INVENTION

This invention relates generally to a tool for removing flanged bearing cups from heavy duty universal joints and particularly to truck type universal joints mounted in place on a truck.

The tool, which may be removably attached to the yoke of a universal joint, having only one moving part, and which can readily be attached to a truck universal joint, or other heavy duty universal joint, while it is in place on the truck or other equipment even though the space about the universal joint may be limited. This tool removes the bearing when a steady outward force is applied to bearing cup through the application of an upward force on the yoke which is at right angles to the yoke containing the bearing to be removed.

The force used in removing the bearing is not only steady, but is only as large as is necessary to remove the bearing. The tool can be used to remove all the bearings consecutively from a universal joint while it is in place. It is unimportant whether the axles leading to the universal joint yokes are in alignment or not in the operation of this tool, because the point of force is effectively to the center of the bearings, regardless of the orientation of the axles. The steady force generated by this tool eliminates the possibility of damaging the yokes or the cross of the universal joint and greatly facilitates the removal of the flanged bearing cups. The tool has a number of attachment holes and other size adjusting means which permits it to be used on a variety of different sized universal joints.

OBJECTS

It is accordingly a general object of the present invention to provide a new and improved tool for removing universal joint bearings.

It is a more particular object of the present invention to provide a means for removing universal joint bearings while mounted in place by applying a steady force, thereby eliminating the possibility of damaging the universal joint parts.

It is another object of the present invention to provide this new and improved bearing removal system using an attachment which is extremely simple in design, easy to use, which has only a single moving part and which is accordingly economical and easy to manufacture with a long and safe operational life.

DETAILED DESCRIPTION OF THE PREFERRED EMBODIMENT

Figure 1:
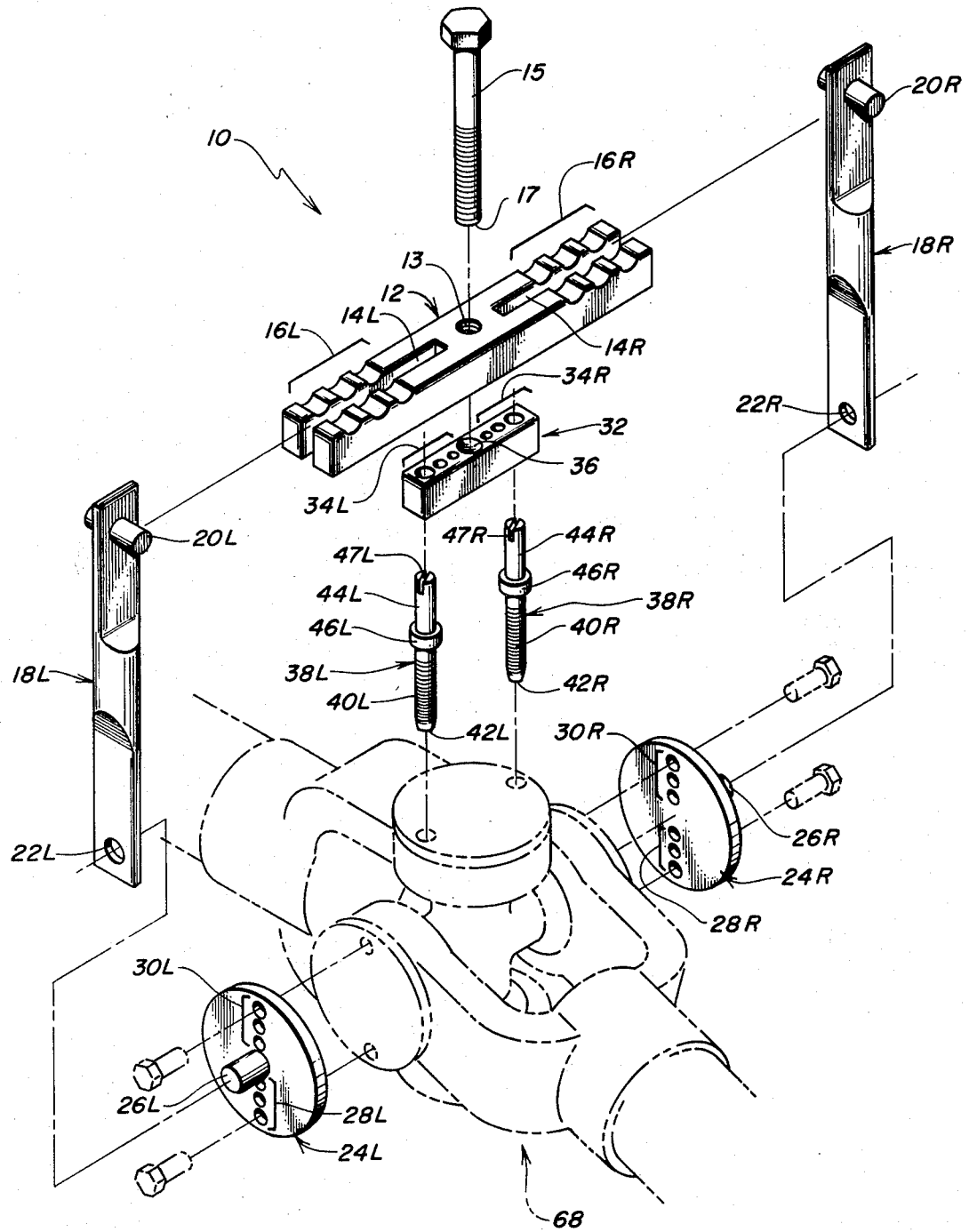
FIG. 1 is a pictorial isometric exploded view of the universal joint tool.

Referring first to FIG. 1, the structure and relative placement of the various parts of the universal joint removal tool can be seen. The tool, indicated generally by numeral 10, is symmetrical about its vertical center axis. Like elements will use the same reference number with a suffex, L, indicating an element generally on the left side of the drawing and with a suffex, R, indicating the corresponding element located on the right side of the drawing. All figures have the tool orientated generally in the same direction, and the description up and down or left and right refer to the orientation as shown in the figures.

A puller bar 12 is provided which has a generally rectangular cross-section and a threaded hole 13 in its center, adapted to receive a puller screw 15. The screw is a threaded bolt having a blunt end 17. The puller bar 12 has slots 14L and 14R aligned along the same axis as hole 13 through the long axis of puller bar 12 to receive puller arms 18L and 18R. The upper portion of bar 12 has a set of symmetrically placed semicircular slots 16L and 16R orientated at right angles to slots 14L and 14R.

Puller arms 18L and 18R are generally rod shaped, having a circular cross-section, but with flattened end portions, one with a pin 20L and 20R permanently affixed through the flattened end, and the opposite end having a hole 22L and 22R. The pins 20L, 20R and holes 22L, 22R are oriented at right angles with respect to one another.

The tool assembly further includes a pair of discs 24L and 24R which are circular shaped and have pins 26L and 26R permanently attached to the center on the outer surfaces of the disc. A set of equal size holes 28L and 30L and 28R and 30R are aligned and symmetrically spaced with respect to the center of the discs 24L and 24R.

A pressure plate 32 is provided which has rectangular cross-section and a circular recess or dimple 36 located at the center of its upper surface with a diameter slightly larger than the diameter of screw 15. Plate 32 also has sets of vertical, symmetrically placed holes 34L and 34R passing therethrough.

A pair of pins 38L and 38R are also included which have a threaded section 40L and 40R between a tapered blunted end 42L and 42R and a collars 46L and 46R. The upper portion 44L and 44R of pressure pins 38L and 38R have the same cross-section as the lower portion but are not threaded. The diameter of pins 38L and 38R at ends 44L and 44R is slightly smaller than that of holes 34L and 34R. There is a slot 47L and 47R in the upper end of pressure pin 38L and 38R respectively, of a proper shape and depth to receive a screwdriver tip. A number of different length pins 38L and 38R can be provided as a part of the bearing disassembly tool kit to permit operation with different sized universal joints.

Figure 2:
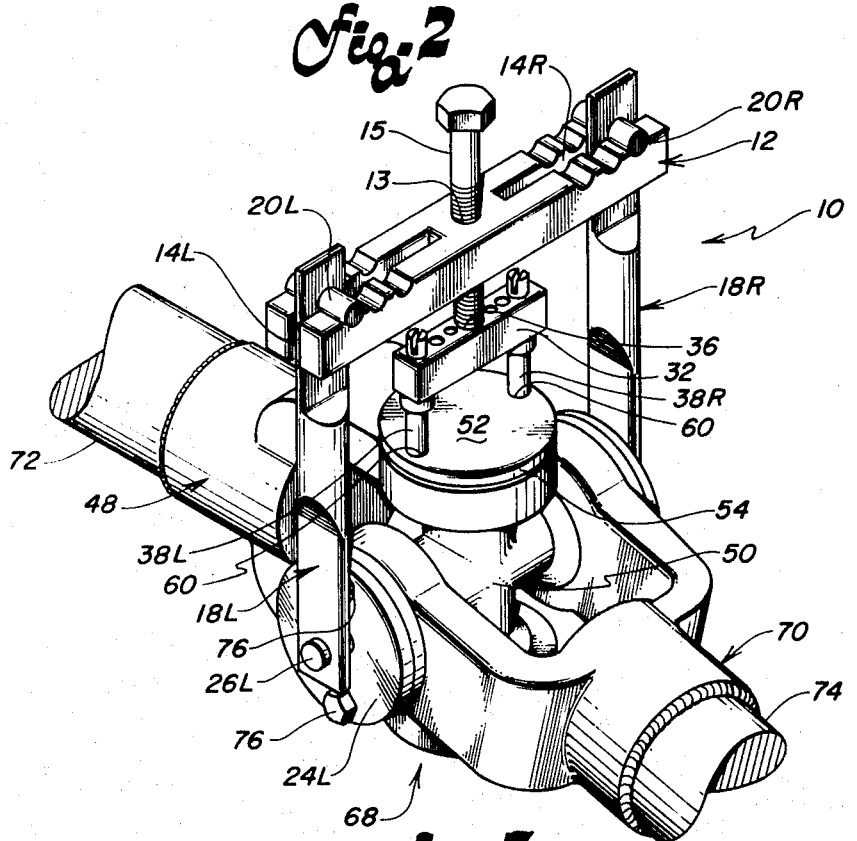
FIG. 2 is an isometric pictorial view in approximately the same orientation as in FIG. 1 of a conventional truck universal joint with the cup bearing removal tool mounted in place showing a flanged bearing partially removed.
Figure 3:
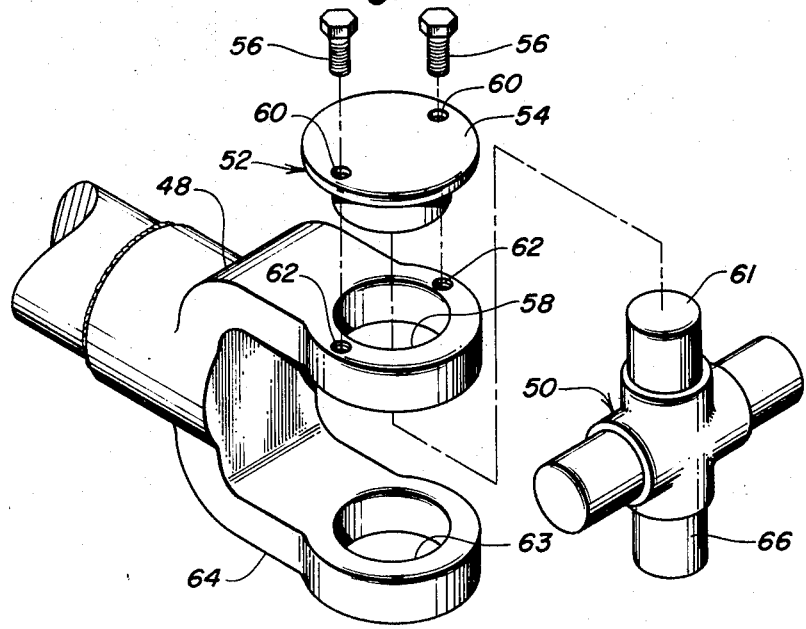
FIG. 3 is a pictorial isometric exploded view illustrating a portion of the components comprising a universal joint.

FIG. 3 shows an exploded view of a portion of the major elements of a universal joint with which the tool of the present invention is to be used. It illustrates a yoke 48, a cross 50, a bearing cup 52 with mounting flange 54 and mounting bolts 56. As can be seen from this relationship, bearing cup 52 is adapted to be inserted into hole 58 in the upper arm of yoke 48 and over the upper arm 61 of the cross 50 until the flange 54 is against the circular shoulder of yoke 48. Holes 60 on the flange align with threaded holes 62 in the yoke 48, permitting the flange to be secured in place by the bolts 56. In like manner, a bearing cup is adapted to be inserted in hole 63 on the opposite arm 64 of yoke 48 over the lower arm 66 of cross 50. A second identical yoke and pair of bearings would complete the universal joint assembly as shown in FIGS. 1 and 2.

FIG. 2 shows the universal joint bearing removal tool 10 mounted in place on a universal joint 68. There are two yokes 48 and 70 welded to drive shafts 72 and 74 respectively. The cross 50 is in its normal position within the yokes with all four bearing cups in position with the upper-most bearing cup 52 in the process of being withdrawn.

The tool 10 is essentially assembled in place about the universal joint 68 in the following manner. All four bolts holding the bearing cups in place in yoke 70 are removed and used to bolt the discs 24L and 24R into position on top of the bearing flanges. Disc 24L is representative, being held in place by bolts 76. In like manner, disc 24R (not shown in FIG. 2) is secured to the opposite side of yoke 70 on top of the opposing bearing flange. The symmetrically placed sets of holes 28L, 30L and 28R, 30R in disk 24L and 24R permit using the same tool assembly on a number of different sized universal joints, with the appropriate holes used to bolt the discs in a central position on the bearing flange.

The bolts securing bearing flange 54 are removed and replaced by pins 38L and 38R, said pins being tightened into the threaded holes 62 by using a screwdriver in slots 47L and 47R until the said pins ends 42L and 42R reach the bottom of their respective holes.

Pressure plate 32 is then placed over the unthreaded ends 44L and 44R and bear against the collar 46L and 46R by guiding the said unthreaded ends into a matching pair of holes of sets 34L and 34R respectively which are the same distance apart as pressure pins 40L and 40R. The pins are each inserted into an outer, middle or inner hole respectively of sets of holes 34L and 34R such that they are equidistant from the center of pressure plate 32.

Screw 15, the only moving part to the tool 10, is turned to withdraw the said screw from threaded hole 13 until only a small portion of the blunt end 17 is still exposed to fit into the matching recess 36 on the pressure plate 32. The bar 12 is then placed over the plate 32 such that the screw 15 is inserted into the matching recess 36 thereof.

The hole 22L on arm 18L is then placed over pin 26L and the end containing the pin 20L is inserted into slot 14L on bar 12 with the pin above the slot. In like manner hole 22R on arm 18R is placed over pin 26R and the end containing the pin 20R is inserted into slot 14R on bar 12.

Holding arms 18L and 18R in place, the screw 15 is tightened using a wrench and pins 20L and 20R are guided simultaneously into a suitable one of the slots 16L and 16R respectively such that the said puller arms are essentially parallel and are equidistant from the center of bar 12. The screw 15 is tightened until pins 20L and 20R are recessed into the selected ones of slots 16L and 16R respectively. The tool is now mounted in place ready to be used and is held in place by its own structure.

The fact that the tool is essentially assembled about the universal joint makes it considerably easier to attach it in the field, in that only relatively small pieces must be placed in the limited space usually available when working on many universal joints.

Further tightening of the screw 15 creates a downward force on plate 32 which is transmitted through the pins 38L and 38R to the portion of yoke 48 adjacent to bearing cup 52. An equal upward counter-force is transmitted through the arms 18L and 18R and through the discs 24L and 24R respectively and thence through the bearing bolts 76 and the corresponding bolts on the opposite side of the yoke into the area adjacent to the other bearing cups. This force adjacent to the bearing cups is in turn transmitted through the bearing cups to cross 50, tending to move the said cross in an upward direction. As the cross 50 moves upward, it exerts a force against the inner surface of bearing 52 forcing it in an upward direction.

As the screw 15 is tightened further, the force acting upward upon the bearing cup 52 is gradually and steadily increased until the force is adequate to move the bearing cup 52 outward from its recess in the yoke 48. The bearing cup will be forced higher and higher out of its mounting recess as the screw 15 is tightened more and more.

It is to be noted that this force will be exerted in the proper direction, regardless of the orientation of drive shafts 72 and 74 in that the said shafts do not have to be aligned in either of their two degrees of freedom for the successful operation of this tool. This can be determined by observing that the tool 10 is secured to yoke 70 through pins 26L and 26R. Any misalignment about this axis will have no effect on the direction or magnitude of the transmission of force to the cross 50 and from there to bearing cup 52, in that the force will always bear upon the pins 26L and 26R in the same direction. In a similar manner, since the force from the tool 10 is transmitted through a single centered screw 15, any misalignment of axles 72 and 74 about the axis defined by the screw will have no effect on the direction of the transmission of or the magnitude of the force applied to the yoke 48. This feature is important because normally a heavy duty universal joint, when mounted in place, does not always have its axles aligned with respect to one another. If alignment were necessary for the operation of this tool, the universal joint would have to be removed to be disassembled, an obviously expensive process, particularly since in most universal joints, the axles 72 and 74 are usually welded to yokes 48 and 70 respectively.

When the bearing cup 52 is forced out of yoke 48 approximately ½ of its length the tool 10 is then removed by disassembly from the universal joint 68. This is accomplished by reversing the steps used in assembling it. After the tool 10 is removed, the exposed bearing cup 52 can readily be removed by tapping it upward against the flange 54 with a small hammer. Once removed, a new replacement bearing is inserted.

The tool 10 is now repositioned to operate upon another bearing cup in the manner described and all the four bearing cups can be removed and replaced one by one, if desired. At no time in this operation must a maul be used upon the yokes 48 and 70 or upon the cross 50 thus eliminating any possibility of damage to these parts.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the appended claims.

What is claimed is:

1. A tool for facilitating the removal of flanged cup bearings from the yoke of a universal joint, said universal joint being of the type including a pair of u-shaped yoke members each having a pair of cup bearings mounted in opposed legs thereof and a cross member having four arms adapted to be inserted in said cup bearings, comprising:
   a. first means adapted to be secured to opposed legs of one of said pair of yoke members;
   b. second means adapted to be connected one leg of the other of said pair of yoke members whose cup bearing is to be removed; and
   c. third means for applying equal and opposite forces to said first and second means, such that said cross member is moved in a direction to force the cup bearing out of said one leg of said other of said pair of yoke members.

2. Apparatus as in claim 1 wherein said first means comprises:
   a. first and second disc members each having a cylindrical projection extending from one surface thereof and adapted to be secured to the opposed legs of said one of said pair of yoke members; and
   b. a pair of linkages adapted to be coupled to the cylindrical projections on said first and second disc members.

3. Apparatus as in claim 2 wherein said second means comprises:
   a. a pair of pins having screw threads on one end thereof and a collar intermediate said one end and the other end thereof, said screw threads adapted to be inserted into threaded apertures in said one leg of said other of said pair of yoke members.

4. Apparatus as in claim 3 wherein said third means comprises:
   a. a pressure plate having a pair of holes passing therethrough for receiving said other end of said pair of pins such that such plate abuts said collars;
   b. a bar member having a central threaded aperture therethrough, said bar member having means at each end thereof for coupling to said pair of linkages; and
   c. screw means passing through said central threaded aperture and contacting said pressure plate at a point between said pair of holes such that as said screw is turned into said central threaded aperture, said pressure plate and said bar member are moved away from one another.

5. A tool for facilitating the removal of flanged cup bearings from the yokes of a heavy duty universal joint comprising:
   a. first and second disc members adapted to be connected to the opposed legs of the universal joint yoke orthogonal to the yoke whose flanged cup bearing is to be removed;
   b. first and second linkages having first and second ends, said first ends being coupled to said first and second disc members;
   c. first and second pin members having a threaded end and a slotted end with a cylindrical collar located between said threaded and slotted ends, said threaded end being adapted to be inserted into threaded holes in the leg of the yoke whose bearing is to be removed;
   d. a pressure plate having first and second apertures therethrough, adapted to be fitted onto the slotted ends of said first and second pin members to abut said collar;

e. a bar member having means at each end thereof for coupling to the second ends of said first and second linkages and a threaded hole located midway between said two ends of said bar members; and
f. a threaded bolt adapted to be inserted into the threaded hole in said bar member to contact said pressure plate such that as said bolt is turned into said threaded hole, the pressure plate and said bar are forced apart causing the cross of the universal joint to move toward said pressure plate forcing the flanged cup member from said yoke member leg.

* * * * *